March 23, 1965     W. R. HOUSE     3,174,227
BLOCK AND BRICK LAYING KIT
Filed Aug. 3, 1962     2 Sheets-Sheet 1
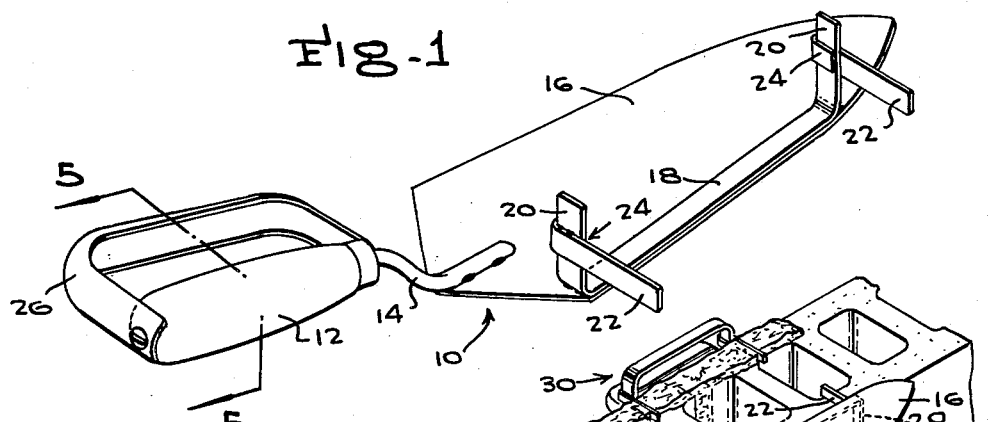
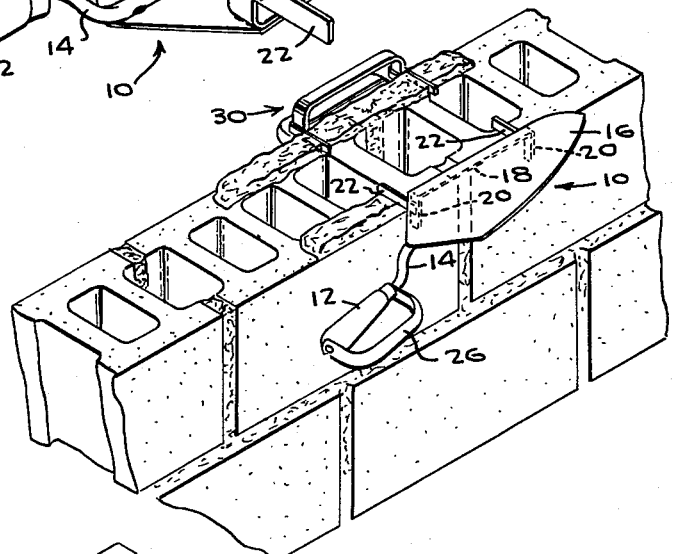
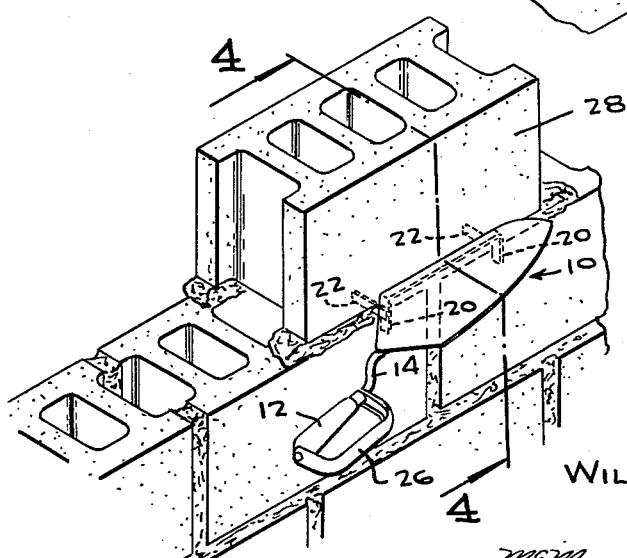
INVENTOR.
WILLIAM R. HOUSE
BY
*McMorrow, Berman & Davidson*
ATTORNEYS

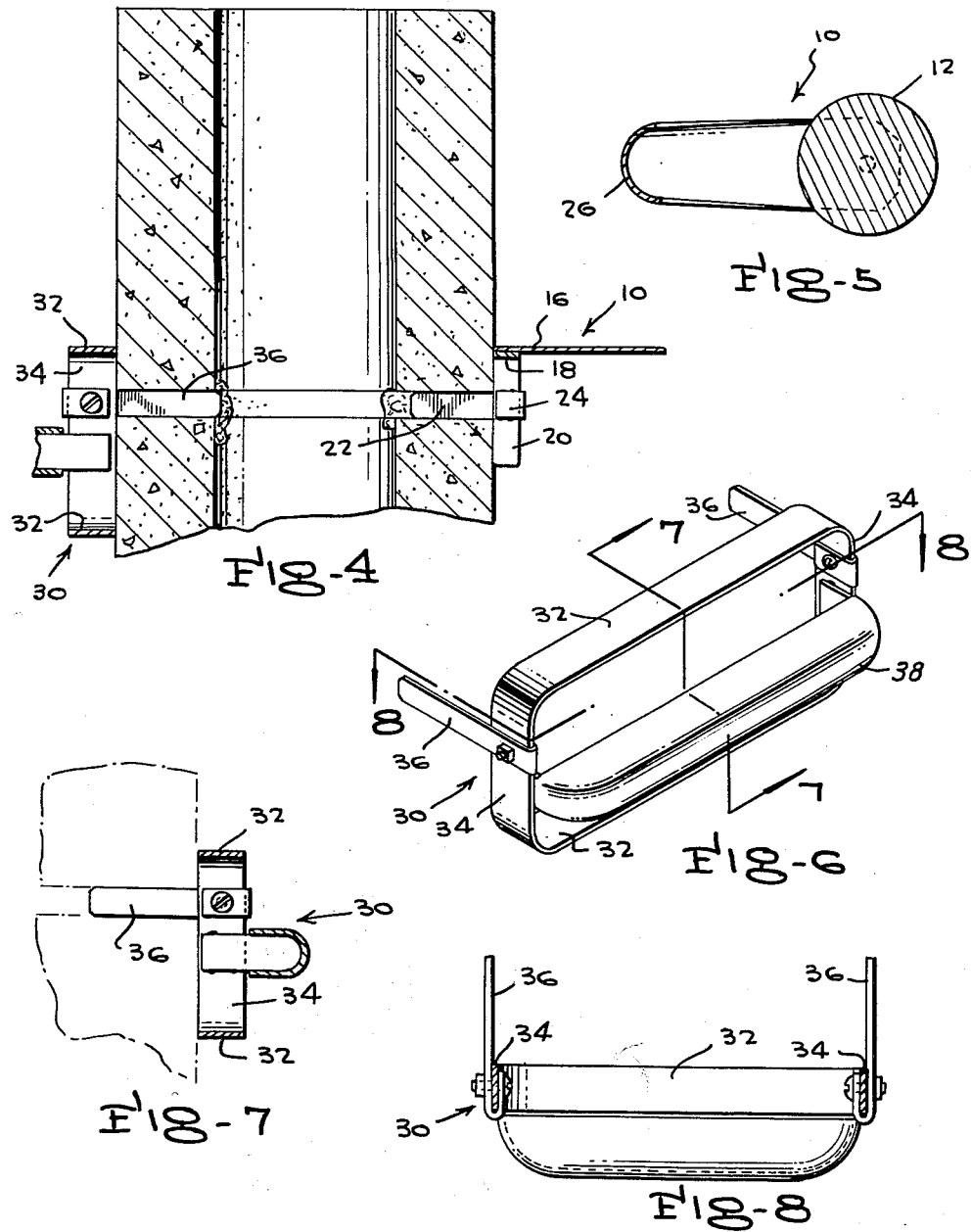

3,174,227
BLOCK AND BRICK LAYING KIT
William R. House, 319 Carlisle SE., Albuquerque, N. Mex.
Filed Aug. 3, 1962, Ser. No. 214,662
5 Claims. (Cl. 33—180)

This invention relates to tools for use in the art of masonry, and in particular to a device for facilitating the aligning of blocks or bricks, as well as ensuring the constancy of inter-block spacing, or thickness of mortar layers.

A skilled workman, in laying masonry units, can operate rapidly and efficiently with a stretched cord constituting the sole guide means for each course. However, the amateur or hobbyist, with no more assistance than a cord line, can fall into serious error in several respects, and it is therefore a general object of the present invention to provide additional guide means. More particularly it is an object to provide a positive gauge for interblock spacing, which minimizes reliance on visual guide means. In still greater particular, it is an object to provide a gauge for inter-block spacing, which also includes guide means for arranging block faces in a common plane.

Yet another object is to provide a gauge as aforesaid which is adapted for conjoint construction with a trowel, as an integral part thereof, as a handling means, and a still further object is to provide a mortar-smoothing tool in association with the gauge features.

In addition to the foregoing, the objects also include provision of a device which is simple of structure, easy of manufacture, and low in cost.

These and other objects, which will be apparent, are attained by the present invention, which may be briefly characterized, in its main features, as comprising a frame having edges defining a plane, and a pair of spaced, mutually parallel gauge straps, extending from said frame, and perpendicular to said plane.

For a more detailed description of the invention, in certain embodiments, reference is made to the following specification, as illustrated in the drawings, in which:

FIGURE 1 is a perspective view of the gauge, shown as an integral part of a trowel, specially related in form, to the gauge, FIGURE 2 is a perspective view of a portion of a masonry block wall, showing the device of FIGURE 1, positioned in operative relation to the wall construction, and also a modified implement comprising the gauge features only, FIGURE 3 is a view similar to that of FIGURE 2, showing an additional block laid over the gauges, as the succeeding step, FIGURE 4 is a sectional view, taken on the plane of the line 4—4 of FIGURE 3, FIGURE 5 is a sectional view through the trowel handle, taken on the line 5—5 of FIGURE 1, FIGURE 6 is a perspective view of the modified gauge shown in FIGURE 2, to enlarged scale, FIGURE 7 is a sectional view, taken on the line 7—7 of FIGURE 6, and FIGURE 8 is a sectional view taken on the line 8—8 of FIGURE 6.

Referring to the drawings by characters of reference, there is shown, in FIGURE 1, a trowel 10, having a handle 12, and a curved shank 14, suitably attached to the trowel blade 16. The gauge element comprises a channel-form, or U-shaped frame having a long, bottom side 18, with perpendicularly disposed, end legs 20, the outer edges of legs 20 lying in a common plane with the outer edges of bottom 18, for a reason presently to be demonstrated. The bottom 18 of the gauge frame is suitably secured, as by welding, to the trowel blade, along one side edge thereof, in such manner that the edge of the blade does not extend outwardly beyond the gauge. To this end, the blade side may have a straight section, coextensive in length with the gauge, or it may have a slight curvature. In an alternative construction, the gauge may be formed from the same piece of sheet metal as the blade, with tabs at the end of a straight, side section of the blade bent to form the legs 20. In either case, the gauge is provided with the pair of bars 22, secured to the respective legs 20, intermediate the ends thereof, and extending outwardly of the said common plane of the gauge, the width of these bars being equal to the desired inter-block spacing, or mortar thickness. As shown, the bars 22 are secured to legs 20 by looped, or hooked, ends 24 on the bars, wrapped around the inner edges of the legs, and secured by welding, but other constructions are possible, consistent with the desired T-formation at each end of the gauge, and in particular, the bars 22 may be integral with parts 18, 20, as formed from a blank.

Attached to trowel handle 12, at each end thereof, is an element 26, in the general semblance of a looped hand guard. This element is of arcuately channel-form cross section, convex outwardly, to provide a smoothing surface, adapted to be drawn along the line of mortar, to recess the mortar in a finished surface, of constant depth and texture.

In laying a block on a lower course, such as in the second course, in FIGURE 2, the mortar is laid along the edges of the blocks, for half a block length on each side of the transverse mortar line between the blocks. Thereafter, the bars 22 of the gauge element on the trowel are placed with lower edges dwelling on the blocks on respective sides of the transverse mortar line, and the outer edges of legs 20 brought into contact with the side faces of the blocks. Thus, when a block 28 (FIGURE 3) is laid in place, it will be properly spaced above the lower course because of its dwell on the top edges of bars 22, and it will be co-planar with the lower blocks by virtue of its contact with the outer edges of legs 20. With the block thus finally positioned, the gauge may be withdrawn.

For maximum precision it is important to gauge both sides of the block at the same time during laying, and to this end, a second, composite trowel may be employed or, as shown in FIGURE 2, a separate gauge 30 may be used on one side. This modified gauge, shown in detail in FIGURES 6–8, comprises a closed, generally rectangular, elongate frame of flat stock, with rounded corners, having a pair of long sides 32, and a pair of short sides 34. The edges on one side of this frame define a reference plane, for the block surfaces, as in the case of the edges of the frame in the gauge on the trowel. The frame carries a pair of extending gauge bars 36, similar to bars 22 as to structure and function. The gauge 30 also has a handle 38, of arcuately channel-form section, arranged parallel to long sides 32 of the frame, and secured to short sides 34 of the frame. Like handguard 26 on the trowel, this handle is adapted for smoothing mortar.

The U-shaped frame of FIGURE 1 may be used in the FIGURE 6 device, and the closed loop frame of the latter may be used in the FIGURE 1 device.

While certain preferred embodiments have been shown and described, modifications will be apparent, in the light of this disclosure, and the invention should not, therefore, be deemed as limited, except insofar as shall appear from the spirit and scope of the appended claims.

I claim:

1. For use in troweling operations, a masonry gauge comprising a frame of flat stock of high, width-thickness ratio having at least one central section, with perpendicularly disposed end sections, with the edges of at least one side of said frame arranged in a common plane, and a bar of said flat stock secured to each of said end sections, medially thereof, and extending perpendicularly from the side defining said plane, and a handle carried by said frame.

2. In a device as in claim 1, a second central section joining said end sections to provide a frame of closed-loop form.

3. A gauge as in claim 1, said handle comprising a plate arranged perpendicularly to said plane, and a handle proper connected to said plate, in offset relation thereto.

4. A gauge as in claim 1, said handle comprising a plate arranged perpendicularly to said plane, and a handle proper connected to said plate, in offset relation thereto, and a looped hand guard on said handle proper, on the side thereof opposite from the outward direction of said bars.

5. A device as in claim 4, said guard comprising an outwardly convex channel member, of curvate cross section.

References Cited by the Examiner
UNITED STATES PATENTS

| | | | |
|---|---|---|---|
| 853,164 | 5/07 | Courtney | 15—105.5 |
| 915,982 | 3/09 | Maddux | 33—180 |
| 1,037,105 | 8/12 | Baugh | 15—105.5 |
| 2,543,716 | 2/51 | Carini | 33—180 |
| 2,543,717 | 2/51 | Carini | 33—180 |

ISAAC LISANN, *Primary Examiner.*